United States Patent [19]

Farnsworth et al.

[11] Patent Number: 5,563,868
[45] Date of Patent: Oct. 8, 1996

[54] OPTICAL SERVO SYSTEM FOR MAGNETIC DISK

[75] Inventors: Stephen W. Farnsworth, Berthoud; Scott D. Wilson, Westminister, both of Colo.

[73] Assignee: Matsushita-Kotobuki Electronics Industries, Ltd., Kagawa, Japan

[21] Appl. No.: 388,908

[22] Filed: Feb. 14, 1995

Related U.S. Application Data

[63] Continuation of Ser. No. 956,016, filed as PCT/US91/04255 Jun. 17, 1991, abandoned, which is a continuation-in-part of Ser. No. 539,625, Jun. 18, 1990, Pat. No. 5,121,371.

[51] Int. Cl.$^6$ ............................................. G11B 7/00
[52] U.S. Cl. ......................... 369/109; 369/103; 369/112
[58] Field of Search ........................ 369/44.11, 44.23, 369/44.24, 44.37, 109, 110, 54, 58, 59, 106, 111, 275.3, 44.26, 44.38, 44.25, 13, 44.14, 44.15; 359/356, 565, 566, 569

[56] References Cited

U.S. PATENT DOCUMENTS

| | | | |
|---|---|---|---|
| 3,720,924 | 3/1973 | Aagard | 369/109 |
| 4,104,489 | 8/1978 | Satoh et al. | 369/103 |
| 4,123,788 | 10/1978 | Kruger | 360/77.03 |
| 4,253,723 | 3/1981 | Kojima et al. | 369/109 |
| 4,486,870 | 12/1984 | Pettigrew et al. | 369/32 |
| 4,525,826 | 6/1985 | Nakamura et al. | 369/109 |
| 4,558,383 | 12/1985 | Johnson | 360/77.2 |
| 4,794,585 | 12/1988 | Lee | 369/112 |
| 4,832,464 | 5/1989 | Kato et al. | 359/19 |
| 4,843,494 | 6/1989 | Cronin et al. | 369/112 |
| 4,879,706 | 11/1989 | Lee | 369/44.23 |
| 4,879,707 | 11/1989 | Getreuer et al. | 369/109 |
| 4,879,708 | 11/1989 | Getreuer et al. | 369/109 |
| 4,914,645 | 4/1990 | Getreuer et al. | 369/44.26 |
| 4,961,123 | 10/1990 | Williams et al. | 360/113 |
| 5,121,371 | 6/1992 | Farnsworth et al. | 369/44.26 |

FOREIGN PATENT DOCUMENTS 0035236  9/1981  European Pat. Off. .

OTHER PUBLICATIONS

"Optical Servo Technique Using Moire Fringes," D. M. Hart, IBM Technical Disclosure Bulletin, vol. 16, No. 9, Feb. 1974.

"Optical Servo of Magnetic Recording", A. S. Hoagland, IBM Technical Disclosure Bulletin, Vo. 20, No. 10, Mar. 1979; pp. 4108–4109.

"Monolithic Optical Track Scanner For Magnetic Recording System", R. A. Scranton, IBM Technical Disclosure Bulletin, vol. 25, No. 12, May 1983 pp. 6432–6433.

"Holographically Generated High Resolution Track Servo Pattern For Optical or Capacitive Readout", H. W. Werlich and P. Young, IBM Technical Disclosure Bulletin, vol. 26, No. 6, Nov. 1983; pp. 2951–2952.

"Optical Recording of Servo Pattern on Magnetic Discs", A. Aviram and R. A. Myers, IBM Technical Disclosure Bulletin, vol. 27, No. 7A, Dec. 1984; pp. 3994–3995.

*Primary Examiner*—Nabil Z. Hindi
*Attorney, Agent, or Firm*—Wenderoth, Lind & Ponack

[57] ABSTRACT

Coherent light passing through slits produces an optical interference pattern having a fringe spacing related to the spacing of the servo tracks on a magnetic disk. The convolution of the interference pattern with the servo tracks generates a servo error signal.

13 Claims, 14 Drawing Sheets

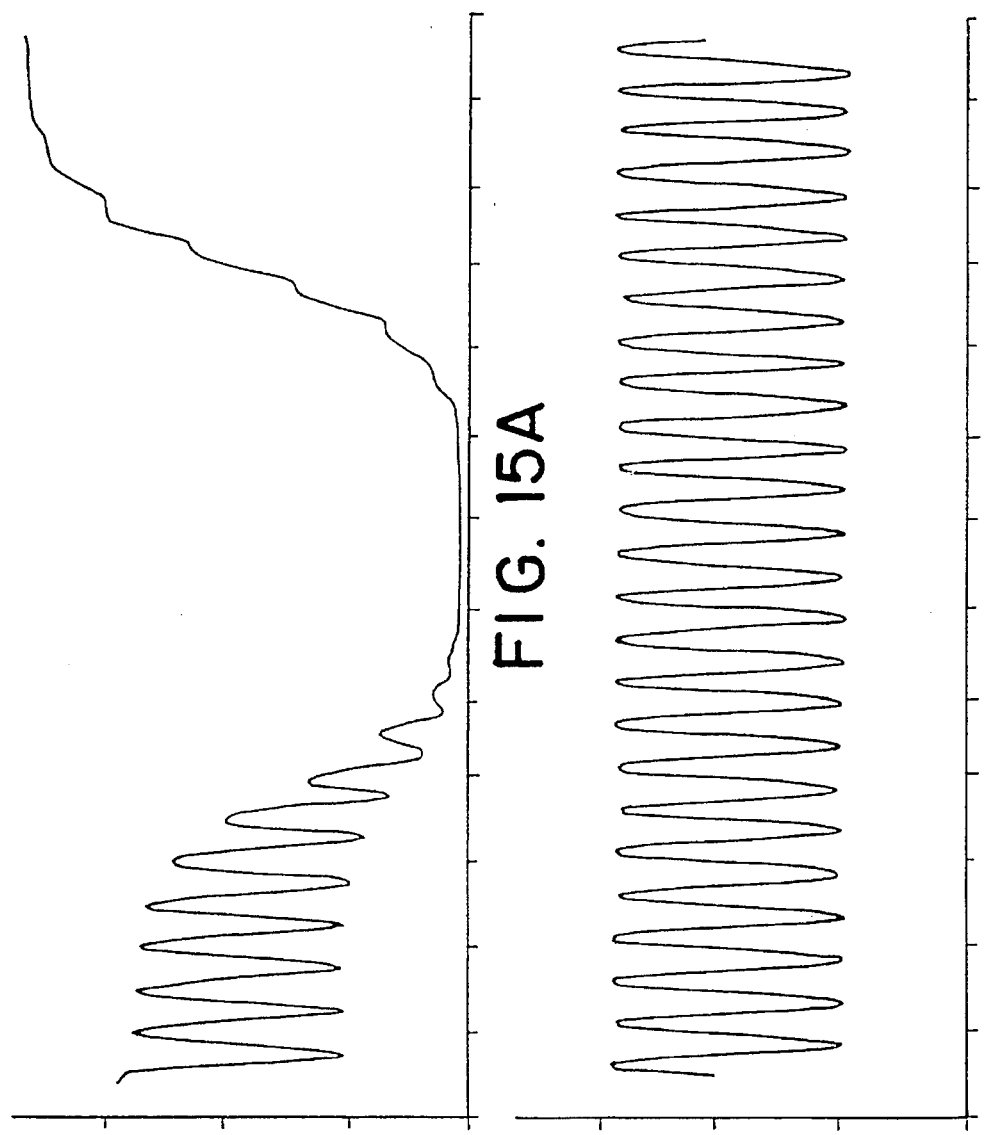

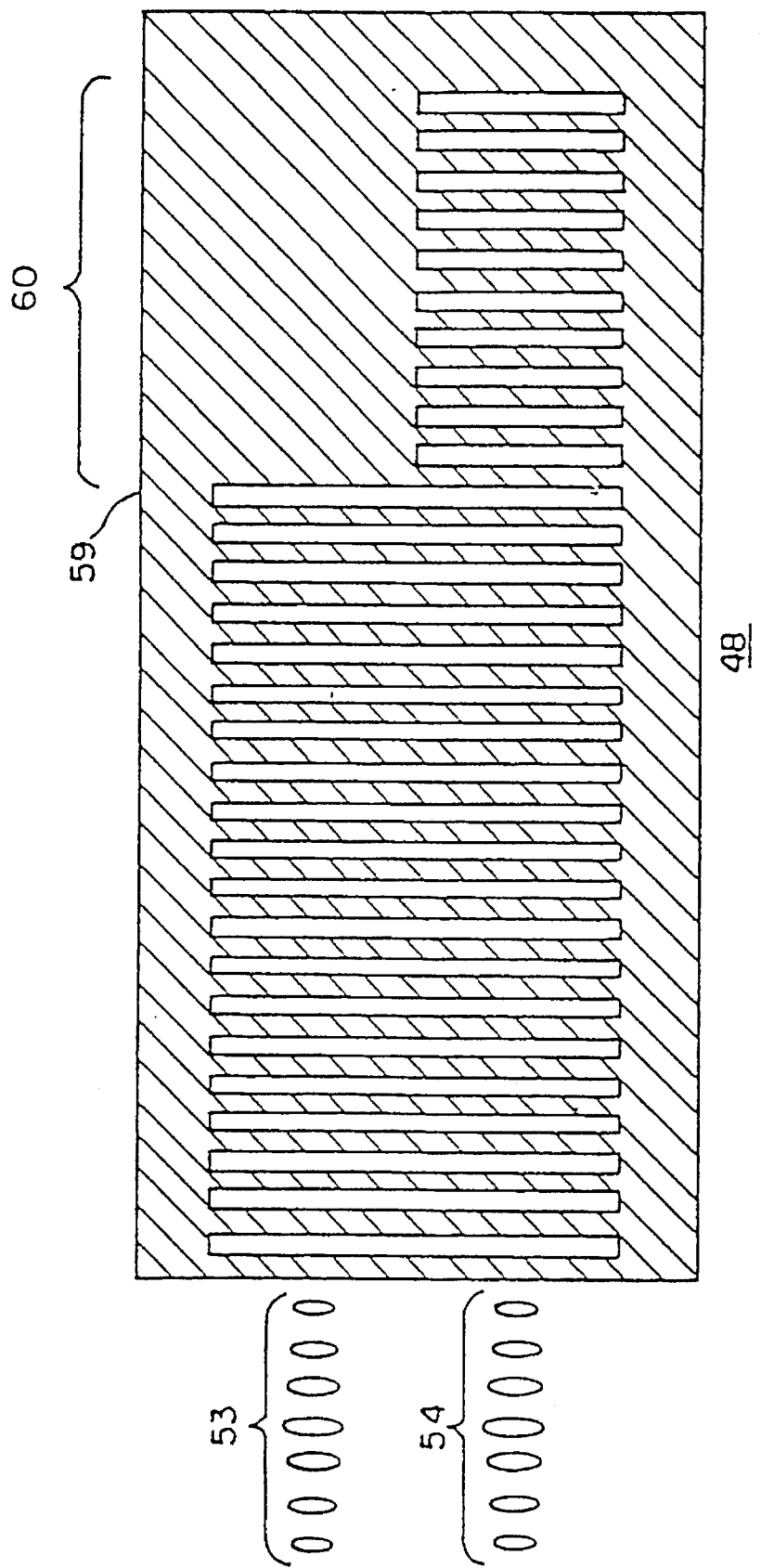

OPTICAL SERVO SYSTEM FOR MAGNETIC DISK

This is a continuation of application Ser. No. 07/956,016, filed as PCT/US91/04255 Jun. 17, 1991, now abandoned which is a continuation-in-part of application Ser. No. 07/539,625, filed Jun. 18, 1990, now U.S. Pat. No. 5,121, 371.

FIELD OF THE INVENTION

The present invention relates to information storage systems and more particularly to an optical sensor and a system for tracking the position of a head with respect to data tracks concentrically, or spirally, spaced about the rotational axis of a disk.

BACKGROUND OF THE INVENTION

The present emphasis in the development of information storage systems is the capability to store more and more information into a so-called "desk top" sized computer memory system. Those "desk top" sized memory systems which incorporate magnetically recorded hard disk media, such as that used in Winchester disk drive type memory systems, currently have the capacity to store upwards of 20 megabytes of magnetically recorded information. The problem with such memory systems is that by necessity the hard disk media is permanently mounted into the computer. Since the media is not easily removable, the use is limited to whatever portion of the hard disk is remaining for information storage at the time of use. Accordingly, magnetically recorded hard disk media information storage systems are not viewed as a potential solution to increasing information storage capacity.

So-called "floppy" disk memory systems wherein flexible disks, each having a diameter of either 5.25 inches or 3.50 inches, are used as the storage media provides easily removable storage media. However, the problem with such storage systems is that the present storage capacity of information magnetically recorded on a single floppy disk used in such a system has not yet reached a level equal to that of the hard disk, i.e., a single floppy disk media can only store approximately 1 to 2 megabytes of magnetically recorded information.

Systems for storing information which can be accessed through optical devices have received significant attention due to their potential capacity to store substantially more data, i.e., on the order of 400 to 800 megabytes of information, than that available in either magnetically recorded hard disk or floppy disk storage systems.

The improved capacity of optical memory is obtained at a higher cost for the media, as well as for the drive when compared to magnetic memory devices. New advances in barium-ferrite (BaFe) magnetic media allows bit densities to exceed optical bit densities. However, track densities of removable magnetic media are many times less than their optical counterparts.

A disk drive which uses an optical track sensing technique to determine the radial position of a magnetic head on a disk has been used to allow higher track densities. One such system is described in AN INTRODUCTION TO THE INSITE 325 FLOPTICAL® DISK DRIVE, Godwin, in a paper presented at the SPIE Optical Data Storage Topical Meeting (1989). This disk drive uses disks containing pre-written optical tracks with a 20 micron pitch. A light emitting diode illuminates the disk. The image of the disk's surface is transferred to a four-element photodetector by a lens and mirror. Such a system has the following drawbacks.

Because the INSITE head uses an L.E.D. as a diffused illumination source, light intensity at the disk, and subsequently on the detector, is very low. This creates a very low level tracking signal which must be greatly amplified electronically. Any system noise at this point also gets amplified and a signal with a high degree of undesired noise is obtained.

The INSITE head senses a very short segment of only two tracks. Since such a small area of the tracks is being detected, then flaws in the disk such as small debris, scratches, roughness of the edges of the optical tracks, or even reflectivity variations all contribute to noise.

The head of the INSITE optical system creates a magnified image (5.5 X) of the surface of the disk with a very short depth of focus (±6 μm). Because of this short depth of focus, the tracking signals degrade very quickly in the presence of shock, vibration, and thermal expansion within the head. INSITE includes a bi-metallic mechanism to compensate for thermal expansion and index of refraction changes within the optical system.

SUMMARY OF THE INVENTION

It is an object of the invention to provide a sensor and an optical tracking system which obviates the foregoing disadvantages in prior disk storage systems.

It is an object of the present invention to provide a magnetic disk storage system with a high track density made possible by using an optical track sensing system which is relatively insensitive to noise, shock, vibration and thermal expansion.

In accordance with the present invention, an optical interference pattern having a fringe spacing related to the spacing between the servo tracks is incident on the disk. A servo error signal which is the convolution of the interference pattern and the servo tracks is generated. This servo error signal controls the positioning of the magnetic head with respect to the data tracks.

The invention has the following advantages over prior optical tracking systems.

A high intensity spot is incident on the disk surface and re-imaged at the detector. This yields a much higher level tracking signal requiring less amplification. The resulting tracking signal has less noise when compared to the INSITE head, for example.

In the invention, the tracking signal is created by sensing a larger area of the disk. The pattern covers an area several tracks wide and several microns long. The reason for detecting a larger area of the disk is to reduce the noise caused by small flaws in the disk or edge roughness in the pre-written servo tracks. This is achieved by effectively averaging the tracking signal over several tracks on the disk at once. An extremely long depth of focus (greater than 1 mm) makes the system insensitive to disk axial runout, shock, vibration, thermal expansion and other thermal changes.

In accordance with another aspect of the invention, the high intensity spot interference pattern is incident upon a fixed grating instead of being incident directly on the disk itself. This grating, or encoder, has a "flag" area which indicates the zero position of the magnetic head. When the optical servo system senses the flag area, an indication is produced that the head is at the zero, or reference, position. This is used to reset the radial position counter of the disk drive.

Further in accordance with the present invention, the optical system of the present invention includes holographic optical elements. These holographic optical elements and a lens are molded on a block of transparent plastic which provides temperature compensation for the optical elements.

In accordance with a further aspect of the invention, the optical servo system includes integrated optical elements which are attached to, and form a monolothic structure with, the magnetic head which reads the data tracks.

The foregoing and other objects, features and advantages of the invention will be better understood from the following more detailed description of a particular embodiment,

DESCRIPTION OF THE DRAWINGS

FIG. 15A shows the servo error signal produced as the spot 53 traverses the portion 56 of the encoder;

FIG. 15B shows the other, non-flagged, servo error signal;

FIG. 16 shows an alternate embodiment of the flag area;

DESCRIPTION OF THE PREFERRED EMBODIMENT

Figure 1:
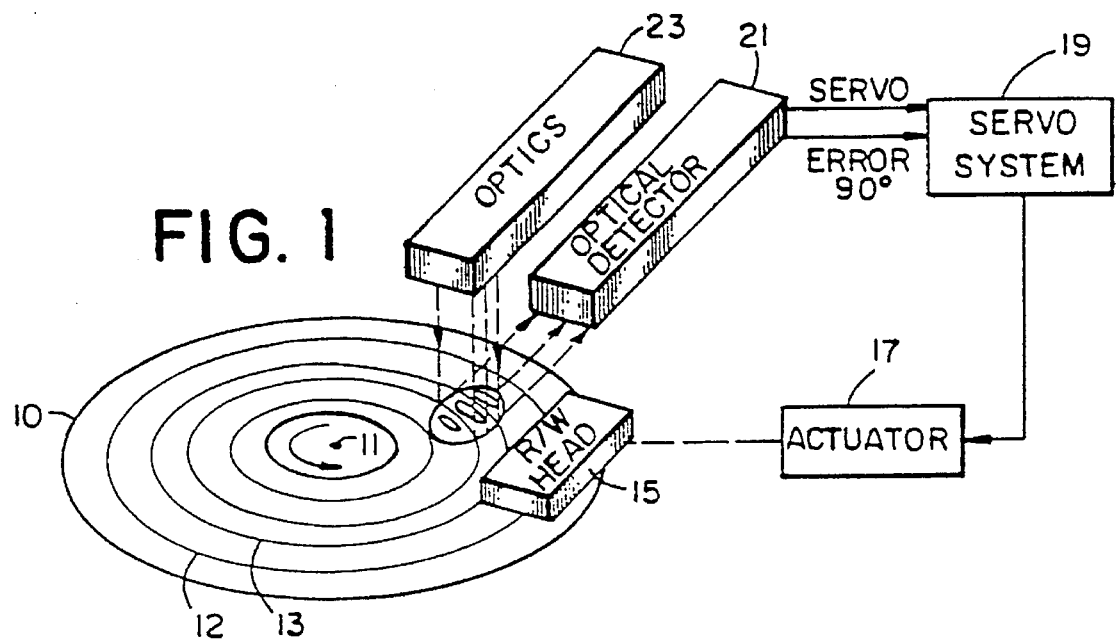
FIG. 1 depicts a disk storage system and an optical tracking system in accordance with the present invention.

FIG. 1 shows a magnetic disk storage system for reading data from or writing data to a removable disk surface 10 having a rotational axis 11 and a plurality of data tracks. Servo tracks 12,13 and others form an optical pattern concentrically recorded with said data tracks. Alternatively, the servo tracks may be a spiral pattern.

The disk is rotated about its axis 11 by a drive which is not shown. A read/write head 15 is positioned adjacent to the disk surface for reading or writing. An actuator 17 positions head 15 with respect to the disk surface. A servo system 19 controls actuator 17. The servo system is responsive to a servo error signal generated by the optical detector 21.

In accordance with the present invention, an optical interference pattern is generated by the optics 23 which is mounted rigidly with read/write head 15. The interference pattern is incident on the servo tracks of the disk immediately next to write head 15. The reflected light is the convolution of the interference pattern and the pre-recorded servo tracks. This light is detected by the optical detector 21 to produce the servo error signal.

Figure 2:
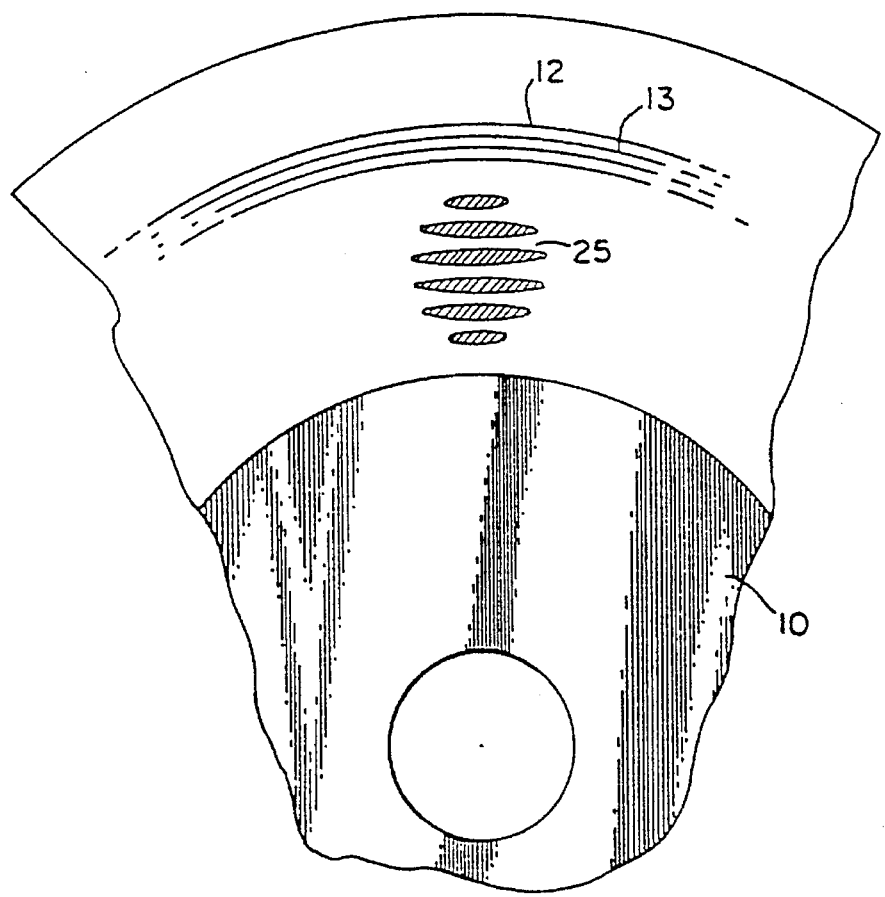
FIG. 2 shows a portion of a disk with the pattern of the servo tracks and the interference pattern thereon.

FIG. 2 depicts a portion of magnetic disk 10. The pre-recorded servo tracks are shown at 12 and 13. The optical interference pattern 25 has fringes which have a spacing approximately equal to the spacing of the servo tracks.

Figure 3:
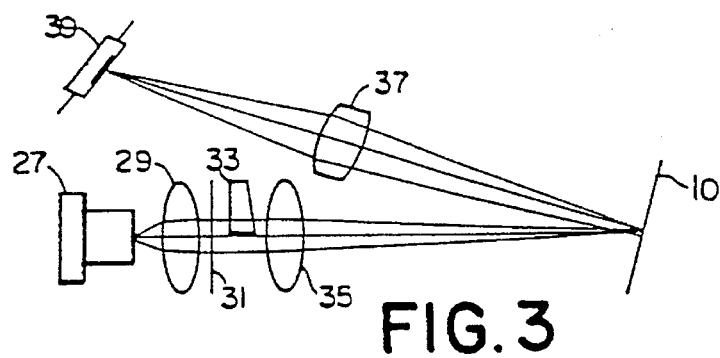
FIG. 3 shows a layout of the tracking system of the present invention.

Referring to FIG. 3, a low power 780 nm laser diode 27 emits coherent light which is gathered by the collecting lens 29. An aperture plate 31 has two slits producing two crossed beams of coherent light. A prism 33 splits the laser beam in the direction orthogonal to the two interfering beams. Prism 33 covers half of the light passing through each slit. Prism 33 rotates half of the beam slightly so that two interference patterns appear in the focal plane of the lens 35. The spots of coherent light are incident upon the disk 10. Incident light is convolved with the pre-recorded optical pattern of the servo tracks on the disk 10. The reflected light is imaged by imaging lens 37 on the binary cell photodetector 39. The two cells detect the two reflected light patterns to produce quadrature signals which are used as the servo error signal.

Figure 4:
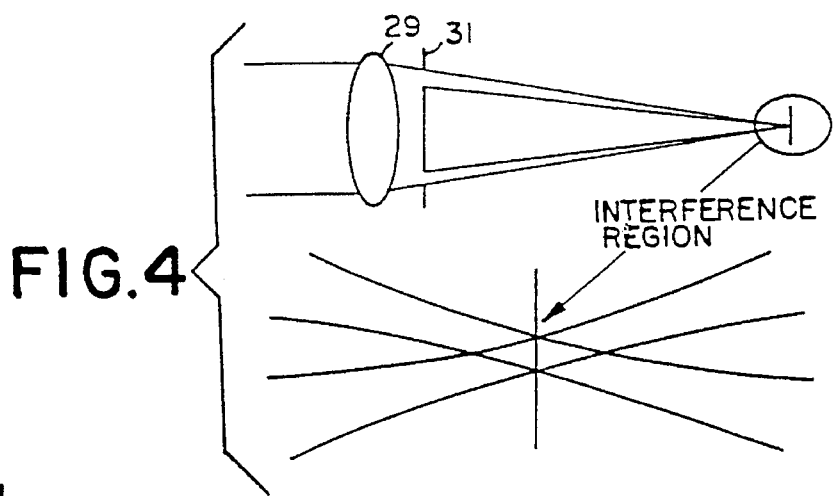
FIG. 4 shows the two slits producing an interference pattern.

As shown in FIG. 4, light passing through spot forming lens 35 is split into two paths of light by the aperture plate 31. An interference pattern of several cycles is created at the focal plane of the lens system. The spatial frequency of the interference pattern is determined by the relative angle of the two crossed beams.

The optical components in the invention can include or be mostly replaced by a multi-zoned Holographic Optical Element ("HOE"), or a multi-zoned replicated optic. The first described embodiment includes a collimator lens, a pair of slits, a prism, and (for the return beam path) a collector lens. All four of these devices or some subset of them can be replaced by either a HOE or an all refractive multi-element array of similar format. Fabricators of such custom HOE's are able to computer-generate and E-beam etch surface relief patterns for replication, and utilize "blazing" as in diffraction gratings to increase light efficiency.

Figure 3A:
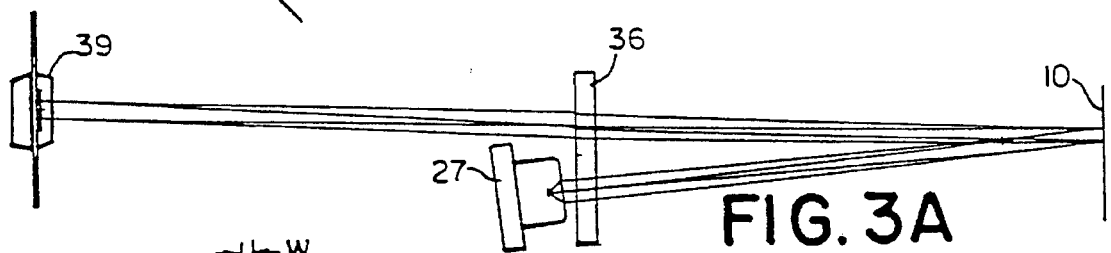
FIG. 3A shows the HOE implementation.

FIG. 3A shows an embodiment in which HOE 36 replaces the lenses, slits and prism of FIG. 3.

Note that a surface embossed hologram with "blaze" is really a cross-over technology device, wherein refraction and diffraction both are used to direct light paths. It combines the function of a Fresnel lens (all refractive) and non-blazed holograms which work strictly by diffraction. Embodiments including the discrete optical devices or the multi-element combinations whether refractive, diffractive, or in combination (i e., "blazed hologram") are all within the scope of the invention.

In the specific embodiment being described, the slit spacing and lens focal length are selected to provide a 2.2° beam angle using a wavelength of 780 nm. As an example, the pitch, i.e., the spacing between the data tracks and the spacing between the servo tracks is approximately 20 microns. In this example, an interference pattern having several cycles of fringes is produced with a spacing between the fringes which is equal to the pitch of the data and servo tracks. A multiple of the relationship between fringe spacing and pitch of the tracks can be used.

Figure 4A:
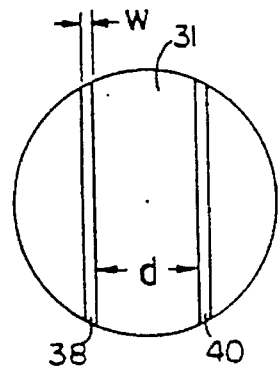
FIG. 4A depicts the width and spacing of the slits.

FIG. 4A depicts the slits 38 and 40 in the aperture plate 31. The slits have a width w and a spacing d.

Figure 4B:
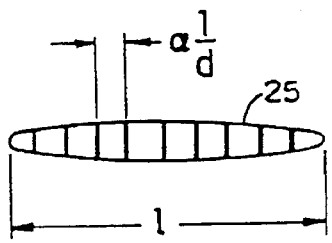
FIG. 4B shows the relationship between the interference pattern and the width and spacing of the slits.

FIG. 4B depicts the relationship between the fringes of the interference pattern and the width and spacing of the aperture plate. The length l of the interference pattern is inversely proportional to the width w of the slits and the spacing between the fringes is inversely proportional to the distance d between the slits.

Figure 5:
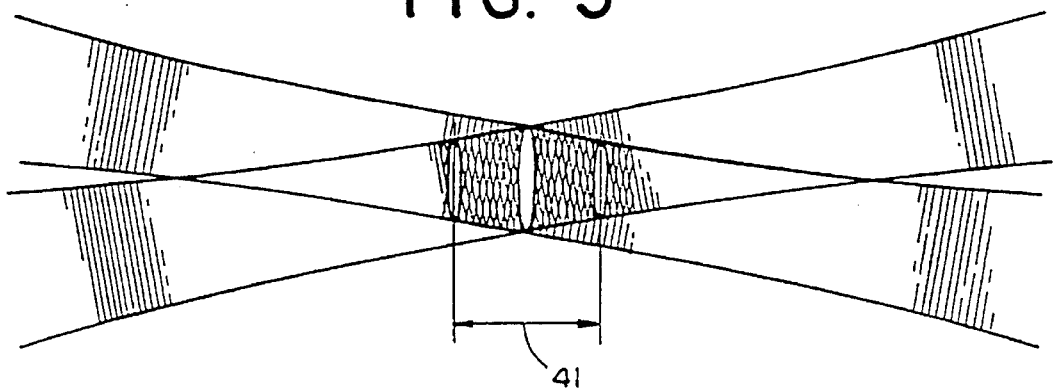
FIG. 5 is an exaggerated enlargement of the interference pattern.

FIG. 5 shows the interference region enlarged and exaggerated to show the advantage of the present invention. An interference pattern is produced throughout the region which has been denoted 41. Because the pattern exists throughout this region, there is no need to focus the light on the disk surface. Rather, as long as the disk surface is in the region 41, the proper interference pattern is incident upon the optical tracks. This long depth of focus, which is about 1mm in the embodiment being discussed, makes the system insensitive to disk axial runout, shock, vibration, thermal expansion and other thermal changes and relaxes manufacturing tolerances. The overlap zone of the two beams is where the interference pattern exists. The three ellipses point out the extent of the overlap (and hence of the interference pattern) for 3 different positions.

Figure 6:
FIG. 6 depicts the optical interference pattern in relation to the servo track.

FIG. 6 depicts the interference pattern 25 produced by the slits in relation to the pre-recorded optical pattern formed by the servo tracks.

Figure 7A:
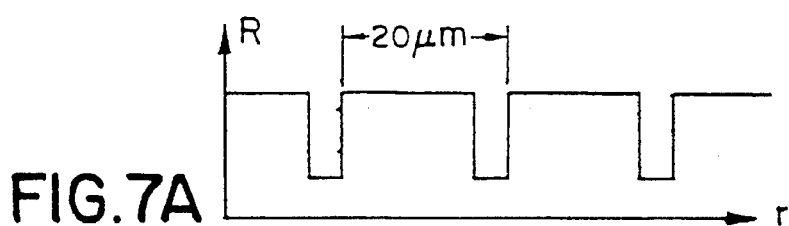
FIG. 7A depicts the reflectivity of the servo tracks as a function of disk radius.

FIG. 7A depicts the reflectivity R of the servo tracks as a function of the radius of the disk.

Figure 7B:
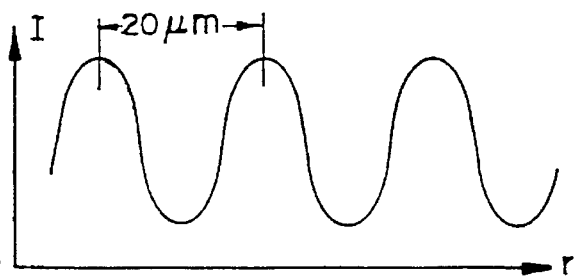
FIG. 7B depicts the light intensity of the optical interference pattern as a function of disk radius.

FIG. 7B shows the intensity I of the optical interference pattern as a function of disk radius r. When the light of the optical interference pattern is reflected from the disk surface, the reflected light is the convolution of incident light intensity and reflectivity of the servo tracks. This is specified by the well-known convolution integral:

$$\int_o^s \int_o^t I(s-x, t-y) \cdot R(x,y) dx dy$$

While the reflection of light has been shown in the specific embodiment, light could be transmitted through the disk. Similarly, the result will be the convolution of the intensity of incident light with the servo pattern. In this case, it is the transmissivity of the medium, rather than the reflectivity, which is convolved with the incident light.

Figures 8, 8A:
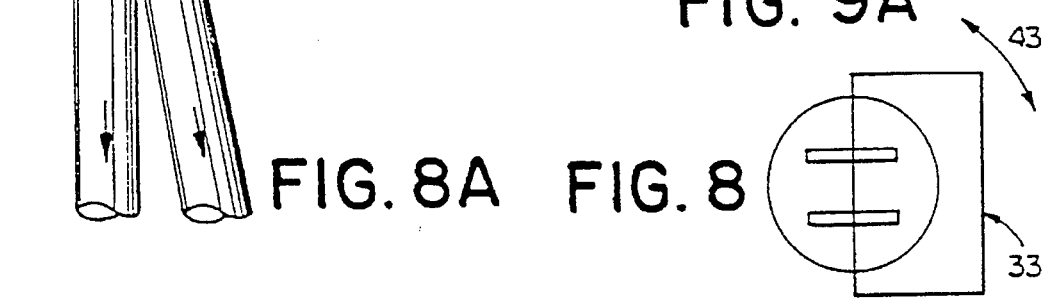
FIG. 8 and 8A depict the prism breaking the optical interference pattern into two optical patterns.

FIG. 8 shows how the prism 33 splits the interference pattern into two spots. Prism 33 covers half of the light passing through each slit. Prism 33 is rotated slightly in the direction indicated by arrow 43 to move one of the spots in the cross track, or radial, direction in order to change its phase relative to the first spot. The prism is adjusted to achieve a 90° phase shift and locked in place. In the embodiment under consideration, less than approximately one degree of rotation is required to achieve a 90° phase shift.

FIG. 8A shows the wedge cross-section of prism 33 and the beam bending action. This shows how the prism alters the location of one spot.

Figure 9:
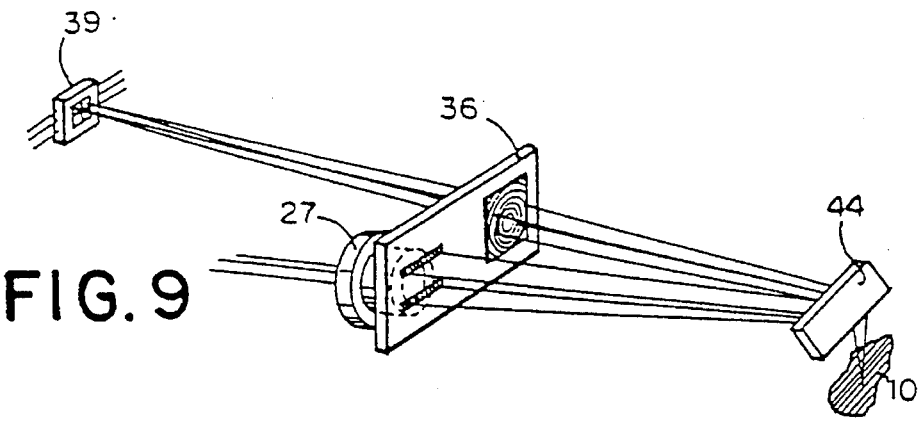
FIG. 9 and 9A show the HOE implementation in more detail.
Figure 9A:
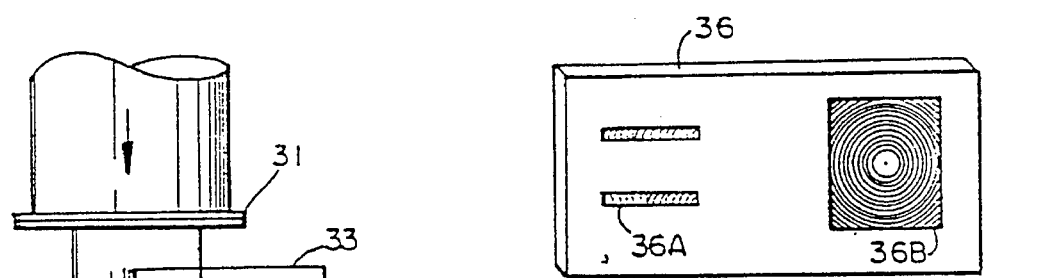

FIGS. 9 and 9A show the holographic implementation in more detail. The HOE 36 has an area 36A which replaces lens 29, slits 31, prism 33 and lens 35. The area 36B replaces the lens 37. FIG. 9 also shows the mirror 44 directing light onto the surface of media 10 and back to detector 39.

Figure 10A:
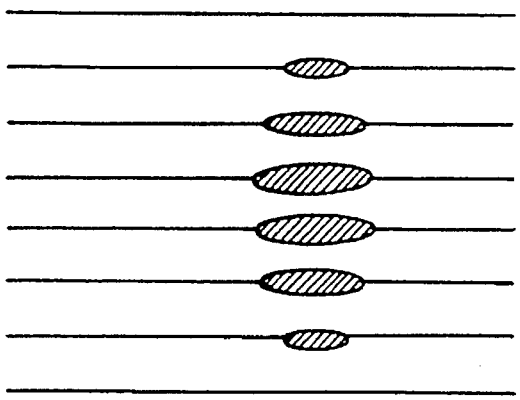
FIGS. 10A and 10B depict the two reflected optical patterns.
Figure 10B:
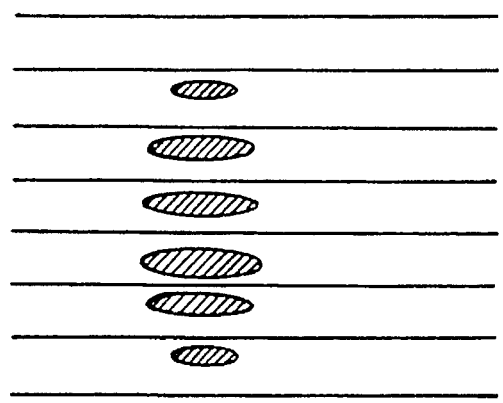

FIGS. 10A and 10B depict the two interference patterns which are 90° out of phase with respect to each other on the servo tracks.

Figure 11A:
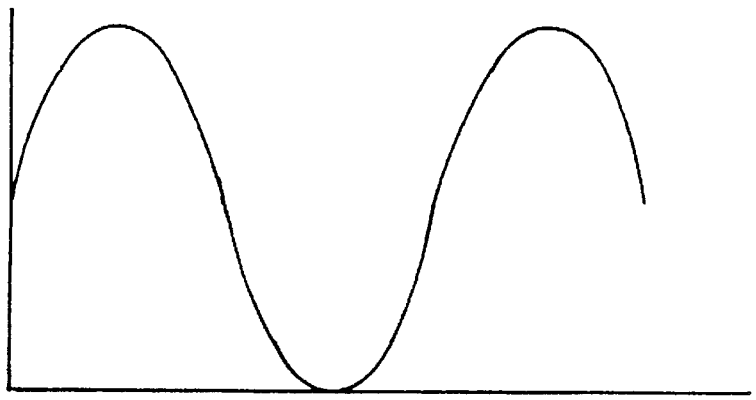
FIGS. 11A and 11b depict the quadrature servo error signals generated by the binary cell photodetector.
Figure 11B:
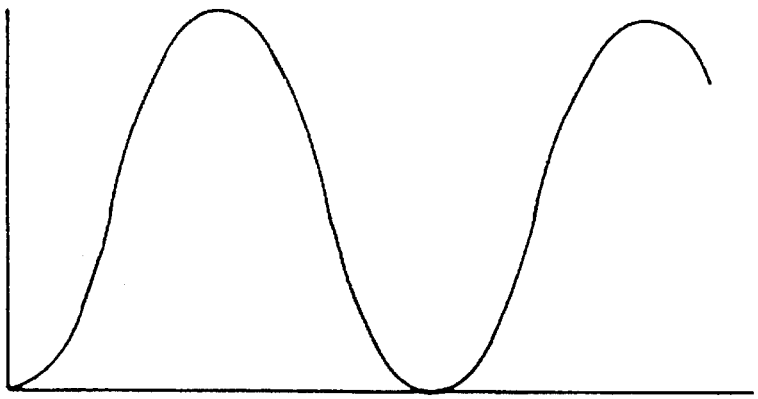

FIG. 11A depicts the sinusoidal signal produced by the photodetector as a function of distance in the radial direction. FIG. 11B depicts the other output of the photodetector which is a sinusoidal signal 90° out of phase with respect to the first signal. These two signals form a quadrature pair which are used in a servo system in a manner known in the art.

The optical head device of the invention can be used with a grating or ruling of the type used in linear position encoders. This is accomplished by making the optical head "dual channel," projecting pairs of spots both onto the media disk and also onto a ruling pattern fixed inside the mechanism acting as a stationary reference scale. The same optical head collects the return light beams from both channels and produces two sets of position signals, for: a) position relative to the media disk data tracks, and b) for position relative to the drive's main framework, i.e., in terms of absolute radius from the spindle center. In this way, the same system provides both the capability of tracking the laser marked media or behaving as a conventional floppy disk drive in positioning by absolute radius from the spindle. The benefit is that with this dual channel detection system plus a dual transducer magnetic head (wide and narrow track) the drive can be made "downward compatible" that is can be made to read and write both the new (e.g., 20 MByte) and the old (e.g., 1.4 MByte) media.

Figure 12:
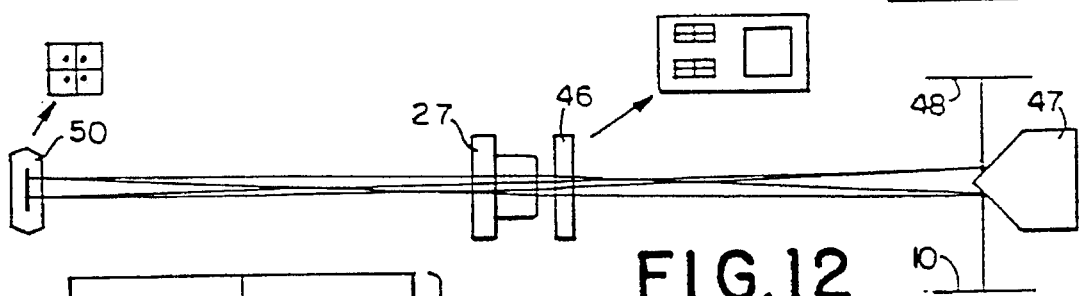
FIG. 12 shows an alternate embodiment with an optical encoder.

FIG. 12 shows such a two channel system. HOE 46 projects four spots which are reflected from mirror 47 onto the disk surface 10 and onto the fixed-scale surface 48 which is like a linear encoder. The reflected light, two spots from disk 10 and two spots from fixed scale surface 48, are re-imaged on the four elements of a quadrant photodetector 50, often referred to as a "quad cell photodetector."

Figure 12A:
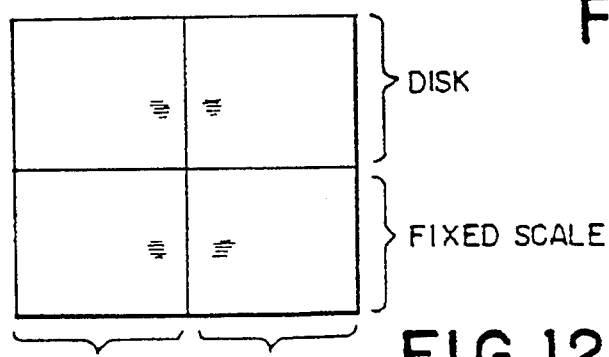
FIG. 12A depicts the quad cell photodetector of FIG. 12.

FIG. 12A depicts the four spots incident on the quad cell photodetector 50. The top two spots are reflected from the disk with one of the spots being 90° out of phase with the other. The bottom two spots are reflected from the fixed scale surface 48 with one spot being 90° out of phase with the other.

The second set of slits to make the second set of spots for the fixed scale surface 48 is positioned at closer spacing than the first, in what was in the single channel embodiment the opaque dead zone between slits, and utilizing light which was wasted before. Note that fringe spacing is inversely proportional to the slit spacing, so the second channel spots have a larger fringe spacing. The spacing is picked to be related to the standard track pitch of the old floppy format so the second channel can be used for locating to that format. A ruled grating of pitch matching the fringe spacing is generated and mounted parallel to the media, aligned parallel to the carriage travel. The optical head directs the two pairs of beams at slightly different angles to get slight vertical separation at the surface of the turn mirror 47. The turn mirror for this version is "delta shaped", having two facets to turn one pair of beams up and the other down—one to the disk, the other to the fixed scale.

"Differential Read" or "Common Mode Rejection" can be achieved in accordance with the invention. For each pair of spots giving quadrature signals in the embodiments described to this point, we can generate instead 4 spots, each 90° of phase apart; now the signals are paired and differenced, to give two quadrature signals with the "dc" component subtracted out. The reflectivity variations and light level variations are much less of a signal processing problem. A much simpler AGC, if any, is required.

Figure 13:
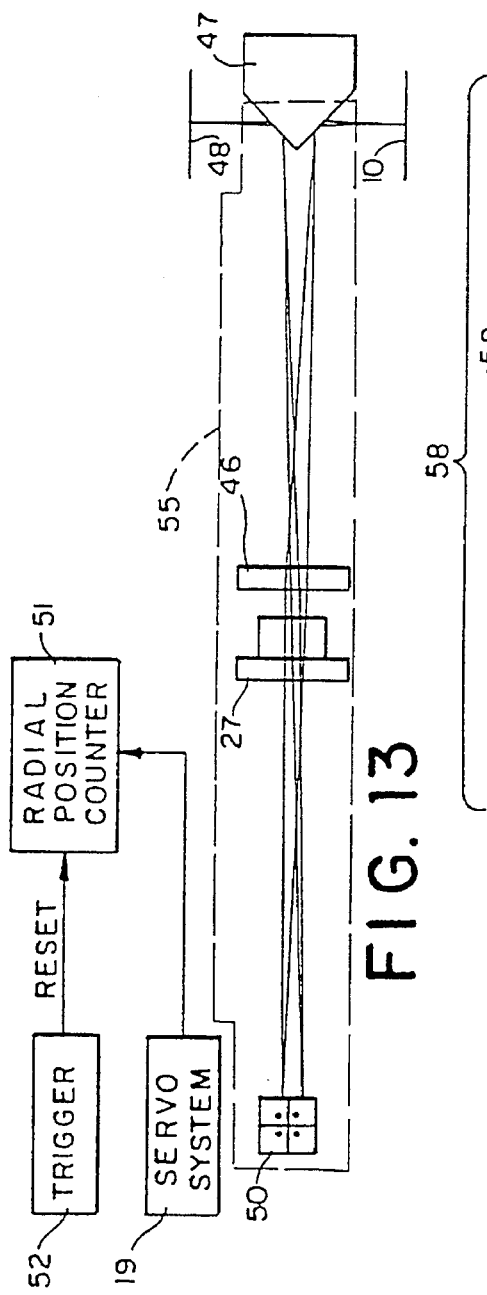
FIG. 13 is similar to FIG. 12, but further shows the servo system used to reset the radial track counter.

FIG. 13 shows how the servo signal generated by the fixed scale surface 48 is used to reset the radial track counter 41. (In FIG. 13, the quadcell photodetector 50 has been shown facing the viewer, instead of the correct edgewise view of FIG. 12.) In FIG. 13, all elements in the optical head housing 55 are enclosed in a dashed line box labeled 55.

Normally, in a disk drive such as the standard 3.5 inch 1.44 MByte floppy, a track zero sensor is required. This device indicates precisely when the carriage is at a reference radius so a radial position counter 51 can be zeroed. This enables a drive to precisely calibrate radial position each time it powers out. Eliminating the conventional electromechanical track zero sensor makes a significant savings in cost and space.

In the simplest embodiment, only the encoder scale grating 48 needs to be modified. The remainder of the optical sensor remains as previously described.

Figure 14:
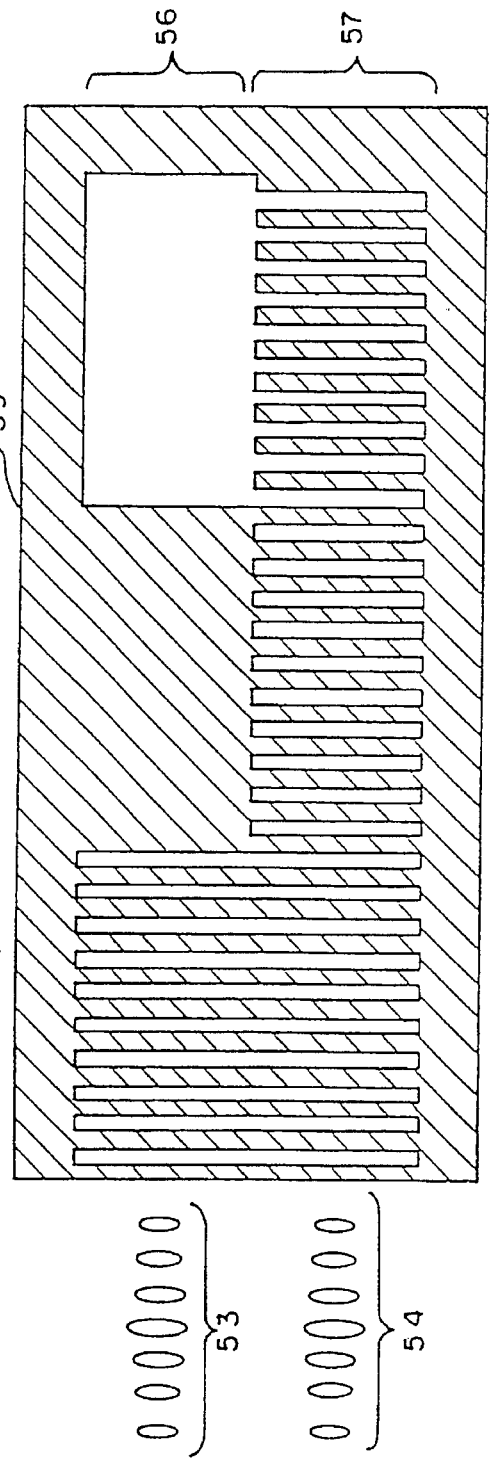
FIG. 14 shows the flag area on the encoder grating.

FIG. 14 shows the two optical interference patterns, or spots, 53 and 54 which are incident upon the encoder fixed scale grating 48 which includes successive light and dark bars. The grating 48 includes a first portion 56 which includes a "flag area" 58 in the path of spot 53. An isolated edge identifies the reference (or zero) radius 59 of the head on the disk. The portion 57 of the encoder grating does not have the flag area. It is traversed by the spot 54.

FIG. 15A shows the servo error signal produced as the spot 53 traverses the portion 56 of the encoder grating.

FIG. 15B shows the servo error signal produced when the spot 54 traverses the area 57 of the encoder grating 55.

The waveform of FIG. 15A is produced as the encoder spot 53 runs off the regular grating through the flag area. First an interval occurs where the sinusoidal modulation is still evident, but is dropping in amplitude to zero. Then, when the light spot 53 crosses the isolated edge in the center of the flag 58, the signal is a ramp with steps. The isolated edge is at the reference radius 59. The servo system 19 discriminates the point at which the spot 53 is crossing the reference radius. The trigger 52 resets the radial track counter 51 repeatably from this waveform. Then radial position is counted from there using only the sine wave signal (FIG. 15B) from spot 54 until the flag spot 53 acquires a normal sine wave signal when it runs off the flag. This means that a quadrature pair of signals is not available for the distance (about ten tracks worth) between the isolated flag edge 59 and the normal encoder scale area, so correct distance measurement through that interval depends on knowledge of the direction of travel, and hence is only reliable while the carriage is flying toward the inner diameter counting the cycles of the single sine wave signal it is getting.

Figure 17A:
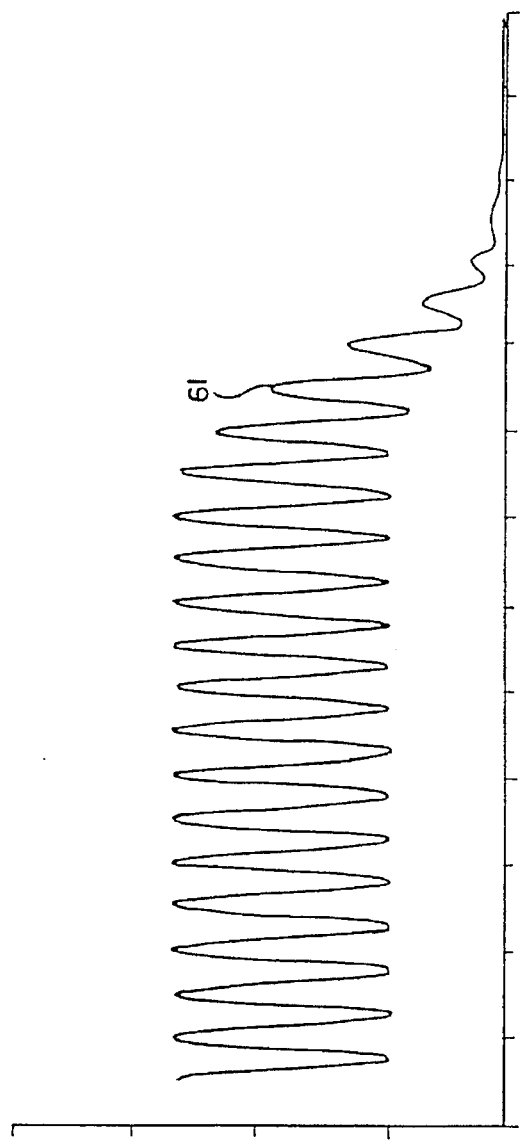
FIG. 17A shows the servo error signal as the spot traverses the flag area of the encoder of FIG. 16.
Figure 17B:
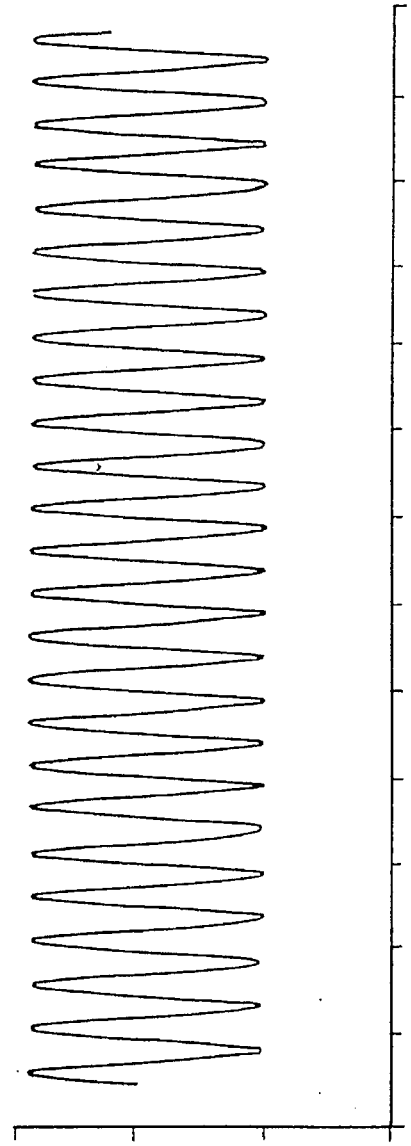
FIG. 17B shows the other, non-flagged, servo error signal.

Another embodiment of the flag is shown in FIG. 16 wherein the grating 48 has a flag area 60 at the end of the encoder consisting only of a void. As in the case of FIG. 14, the flag area is approximately half the width of the encoder grating and is disposed such that only one of the spots, the flag spot 53, moves across it, and so that the edge of the flag is located essentially at the position where the light spots fall when the carriage is at the reference radius. Therefore, when the spot 53 is moving across the edge into the void, the sinusoidal servo error signal falls to about half amplitude just at the time when the carriage is at the reference radius. This is indicated at 61 in the sinusoidal servo error signal shown in FIG. 17A. FIG. 17B shows the normal undisturbed servo error signal produced by the spot 54, in quadrature with the spot 53. The servo system 19 triggers from these two waveforms, but both signals are present and usable with their quadrature relationship, so the servo system 19 has full information regardless of the disk runout or carriage direction.

Figure 18:
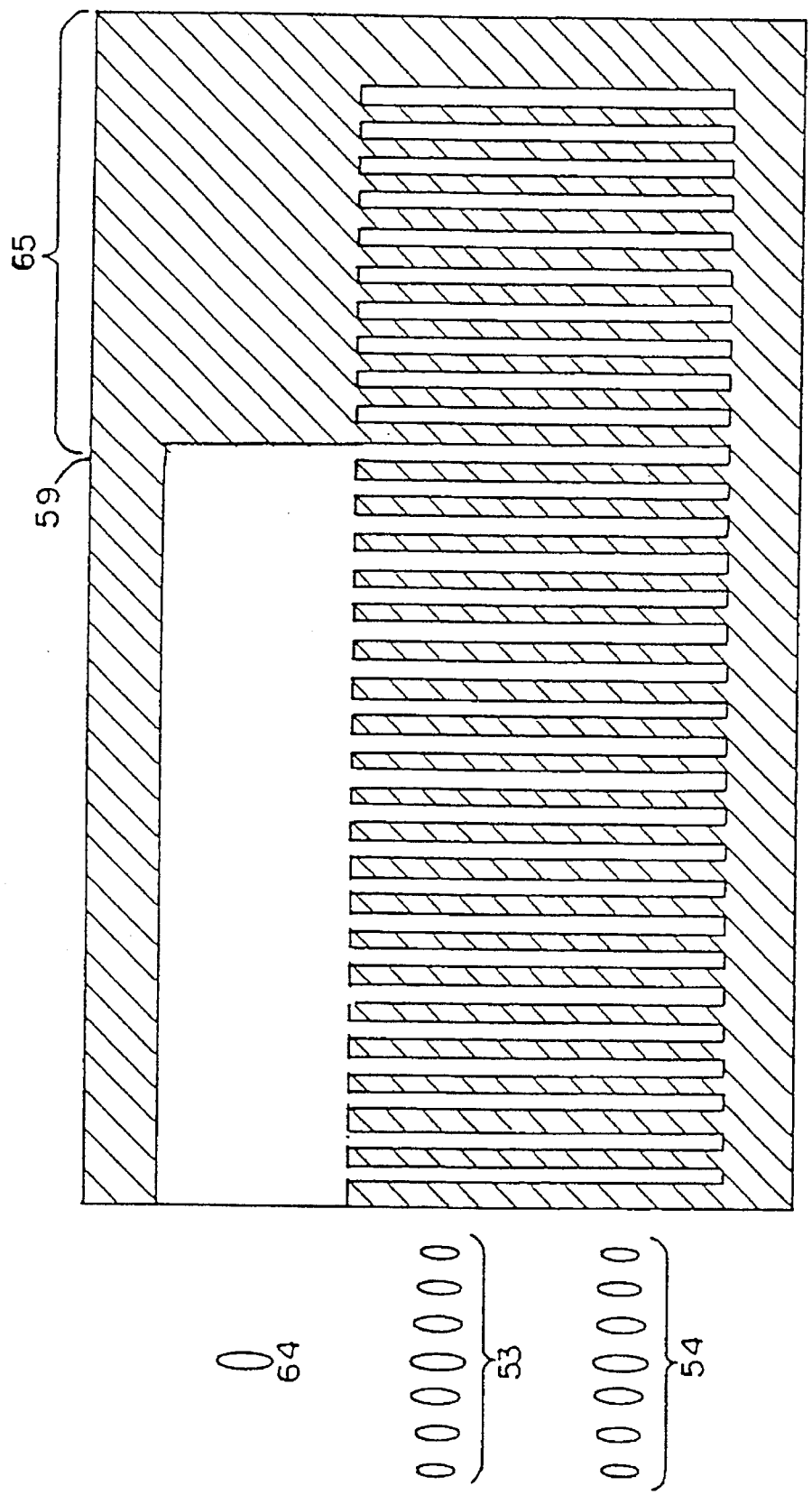
FIG. 18 depicts an alternate embodiment in which a separate interference pattern, or spot, traverses the flag area on the encoder.

FIG. 18 shows another embodiment using a separate spot 64 which passes through a separate flag area 65 on the encoder grating. An additional photodetector is required for this embodiment. In the holographic optical element embodiment of the invention, the HOE has a zone which creates the additional spot 64 narrowly focused in the radial direction beside or between the other two encoder spots 53 and 54. The encoder has a flag 65 that intercepts only the spot 64. The flag can be the void type shown in FIG. 16, or it can be of the type shown in FIG. 14. The servo signal in this embodiment has a steep, easy to trigger edge occurring at the reference radial position 59 while the other two encoder signals are at full and unchanging amplitude in their quadrature relationship.

Figure 18A:
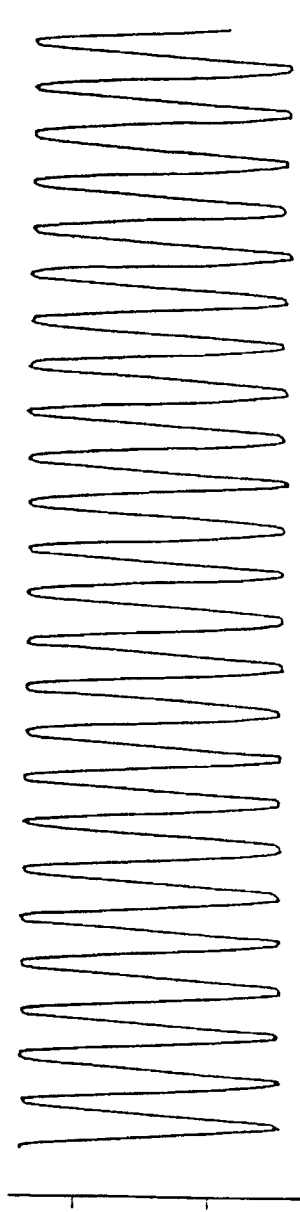
FIG. 18A shows the servo error signal as the spot traverses the grating of FIG. 18.
Figure 18B:
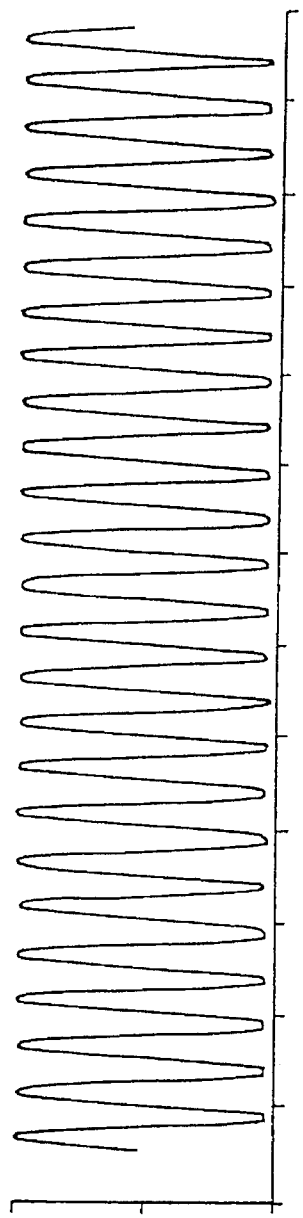
FIG. 18B shows the servo error signal as the spot traverses the grating.
Figure 18C:
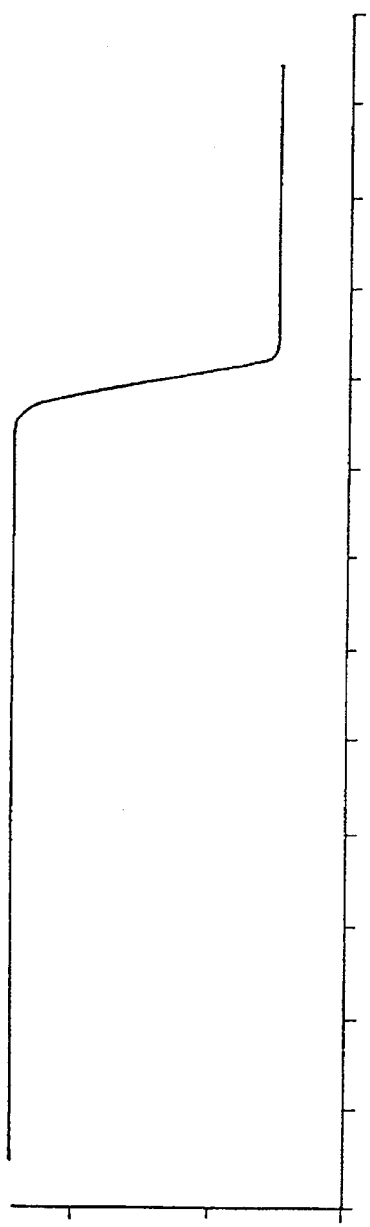
FIG. 18C shows the signal produced as the spot 64 traverses the grating of FIG. 18.

FIG. 18A shows the servo error signal produced as the spot 53 traverses the grating and FIG. 18B shows the servo error signal produced as the spot 54 traverses the grating. FIG. 18C shows the signal produced when the spot 64 traverses the void 65 and particularly shows the sharp edge produced as the spot passes the reference location 59.

Figure 19A:
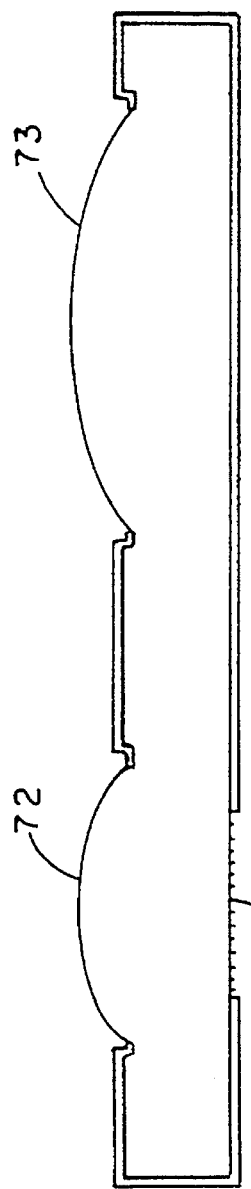
FIG. 19A is an edge view of a plastic block on which holographic elements and lenses are molded.
Figure 19B:
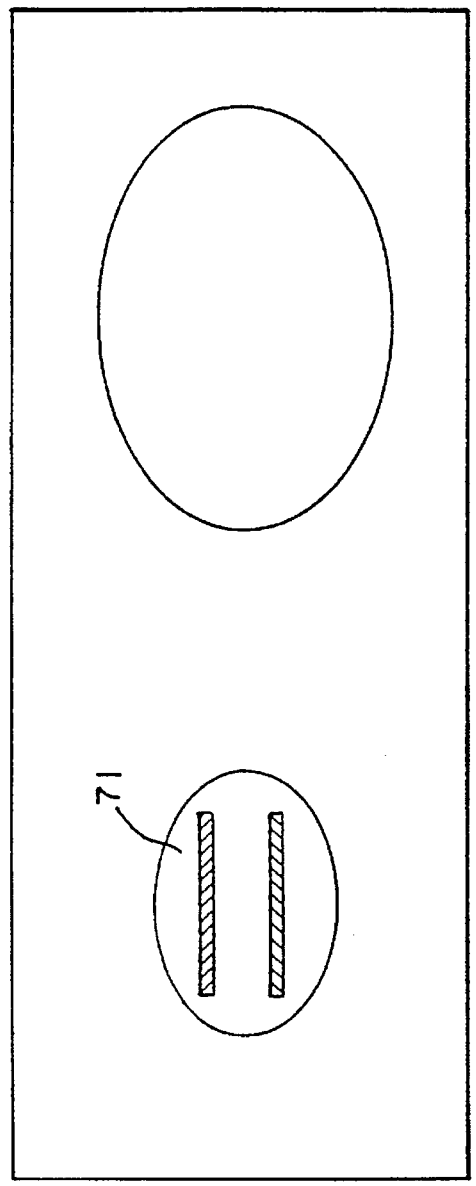
FIG. 19B is a bottom plan view of the plastic block of FIG. 19A.

FIGS. 19A and 19B show the holographic optical elements 71, the collimator lens 72 and the condenser lens 73 molded on a clear plastic blank. This embodiment of the invention provides for thermal compensation.

Laser diodes characteristically change wavelength with temperature, which gives the problem that the focal plane of a hologram shifts from the wavelength change as temperature of the laser changes. The range of temperature in which the optical tracking sensor of the invention works is several tens of degrees centigrade, enough to cause about 10 nanometers wavelength shift and enough focus shift to degrade the signal amplitude significantly. Similarly, a thermal shift problem is inherent with the embodiment using molded plastic lenses instead of a HOE. In this case, the primary contributor is the rate of change of diffractive index with temperature rather than the change of index with laser wavelength. The two phenomena have opposite sign. It is therefore possible to fashion a temperature compensated optical device analogous to the HOE which has ray bending power both in a holographic element and a molded plastic refractive element which has essentially zero focal plane shift with change of temperature of the head.

This combination device is molded into the rectangular block of transparent plastic with the HOE features 71 molded into one flat surface, but with the addition of lenslet bulges 72 and 73 molded into the opposite surface.

The temperature problem and the features of the invention that compensates for it are described below. With just a holographic element and a laser diode in an aluminum housing the contributions to the change of image focal distance with a RISE in temperature are:

1. Wavelength of laser INCREASES, decreasing focal length of hologram, making distance to image DECREASE.
2. Material between the laser and hologram expands, INCREASING distance of source from hologram, DECREASING distance to image focus.
3. Physical size of the hologram expands, INCREASING (slightly) its focal length, INCREASING distance to image focus.
4. Physical length of the housing between the hologram and the media surface, the desired image focal plane, expands (a small amount), so it is a "moving target." If the head is properly temperature compensated, the change of image location from 1 through 3 above will be an INCREASE equal to this.

The similar list for a plastic lens version of the optical head has almost the same list, except for one difference: Item 1 changes, with two parts:

a. Index of refraction of the lens DECREASES, causing the focal length of the lens to INCREASE and distance to image focus to INCREASE.
b. Index of refraction of the lens depends on wave length slightly, such that with the INCREASE of wavelength with temperature the index DECREASES, lengthening the focal length and causing the distance to image to INCREASE.

Part 1 is dominant in the HOE case and Part 1a in the plastic lens case, so the defocus goes from a large decrease to a large increase.

Actual calculations for one working embodiment of the invention show that for the HOE-only system a 40 degree centigrade rise in temperature causes the image focal plane to change about −2.6 mm relative to the media plane (minus indicates decrease), an unacceptably large amount. The plastic lens version gets about +2.2 mm change, almost as large but in the opposite direction. This circumstance lends itself to the compensation method of making a combination where about half the lens power is in a plastic lens and the rest in the holographic element, prorated so their changes with temperature cancel. The following example illustrates the invention.

Figure 21:
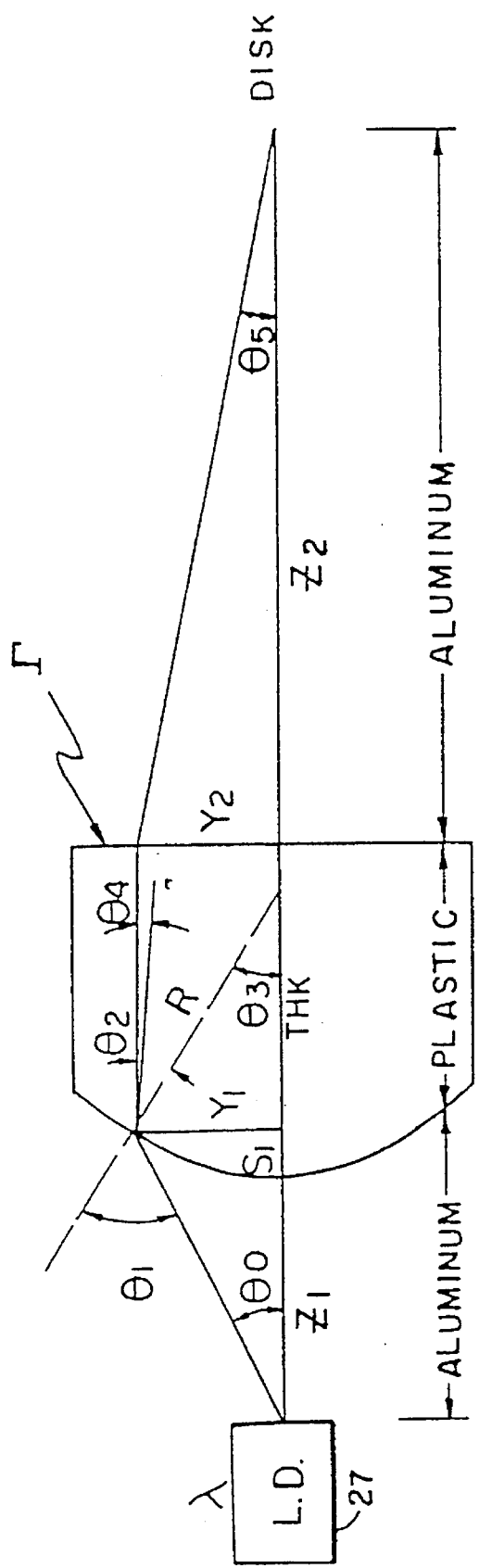
FIG. 21 shows a ray path through a curved surface of a plastic lens.

FIG. 21 shows a ray path through a curved surface, the plastic lens surface, then bending at the second flat surface at a point labeled "Γ". This is the bend by diffraction of the lines of the HOE, and "F" stands for the center-to-center spacing of the lines, given in units microns, abbreviated μm.

Assume the following parameters, all at room temperatures:

R=8.148 mm

THK=1.500 mm

N=1.572791

$dN/dT = -14.10^5/°C.$ $\alpha(\text{Plastic}) = 10.10^{-6}/°C.$ $\alpha(\text{AL.}) = 23.4 \cdot 10^{-6}/°C.$ $d\gamma/dT = 0.25^{nm}/°C.$ γ=0.79 μm $\theta_5 = 1.109°$ $Z_2 = 37.805$ mm $\theta_. = 6/253°$ Γ=13.6 μm The following parameters can be computed:

$Y_1, \Gamma, \theta_1, \theta_2, \theta_3, \theta_4$.

These parameters are computed from the eight formulas describing:

1. Input Geometry;
2. Sag of Curve;
3. Refraction;
4. Inside Geometry;
5. Thickness;
6. Diffraction;
7. Internal Angles; and
8. Output Geometry Since R, THK, γ, N, θ., $\theta_5$, and $Z_2$ were chosen, one way to solve the problem is to find $Y_1$ numerically on a computer.

The resulting embodiment is:

R=8.148 mm

THK=1.500 mm

N=1.572791

γ=0.79 μm

θ=6.253°

$\theta_5 = 1.109°$ $Z_2 = 37.805$ mm ($Y_2 = 0.7318$ mm)

$Y_1 = 0.6748$ mm $\theta_2 = 0.115$ radians $\theta_3 = 0.0829$ radians $\theta_4 = 0.03874$ radians $S_1 = 0.02799$ mm Γ=13.6018 m $Z_1 = 6.1305$ mm Starting with this embodiment at room temperature, the change in focus relative to the disk can be calculated. Suppose Δ=+20° C. The following occur:

Index of refraction, N, changes (decreases).

Radius of curvature, R, changes (increases).

$Z_1$ expands (increases)

THK expands (increases)

$Y_2$ expands (increases)

Γ expands (increases)

Laser wavelength increases (increases)

$Z_2$ expands (increases)

EXPANSION OF $Z_2$:

$$\Delta Z_2 = Z_2 \cdot \alpha_N \cdot \Delta T$$

$$= (37.805)(23.4 \cdot 10^{-6})(20°) = .018 \text{ mm}.$$

Let $Z_3$=Axial Position of Focussed Spot. $\Delta Z_3$ can be calculated for $\Delta T$=+20° C.
Formula No. 8 now becomes:

$$\tan \theta_5 = Y_2/Z_3$$

With temperature change:
R=8.148 increases to 8.1594
N=1.57279 changes to 1.56999 (more correctly the change in the index of refraction should be:

$$\frac{dN}{dT} \Delta T + \frac{dN}{d\lambda} \cdot \frac{d\lambda}{dT} \Delta T)$$

THK=1.500 increases to 1.5021
$\gamma$=0.790 increases to 0.795
$Y_2$=0.7318 increases to 0.7329
$\Gamma$=13.6018 increases to 13.6208
$Z_1$=6.1305 increases to 6.1334
By a similar method, described above, $Y_1$, the angles, and $Z_3$ are obtained.
$Y_1$=0.67533
$\theta_5$=1.110°
$Z_3$=37.8228 mm. This is an increase of $\Delta Z_3$=+0.018 mm. This is the same as for $\Delta Z_2$.

The conclusion is that $\Delta Z_3$ (the change of image focal distance) is +0.018 mm, the same as $\Delta Z_2$ (the change of the physical distance between optics and media), so the head is "thermally compensated."

Figure 20B:
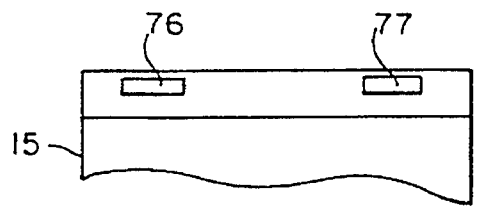
FIG. 20B is a partial rear view of the heads of FIG. 20A.
Figure 20A:
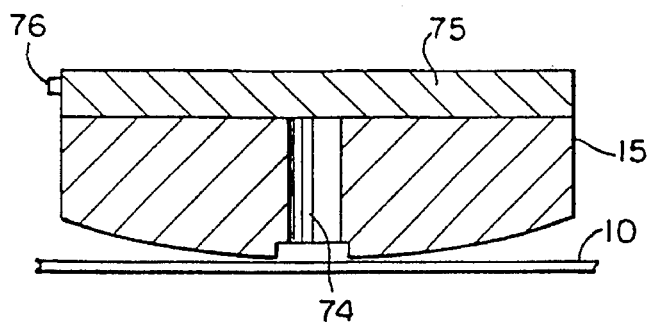
FIG. 20A is a cross-section view of an integrated optics head with attached magnetic head.
Figure 20C:
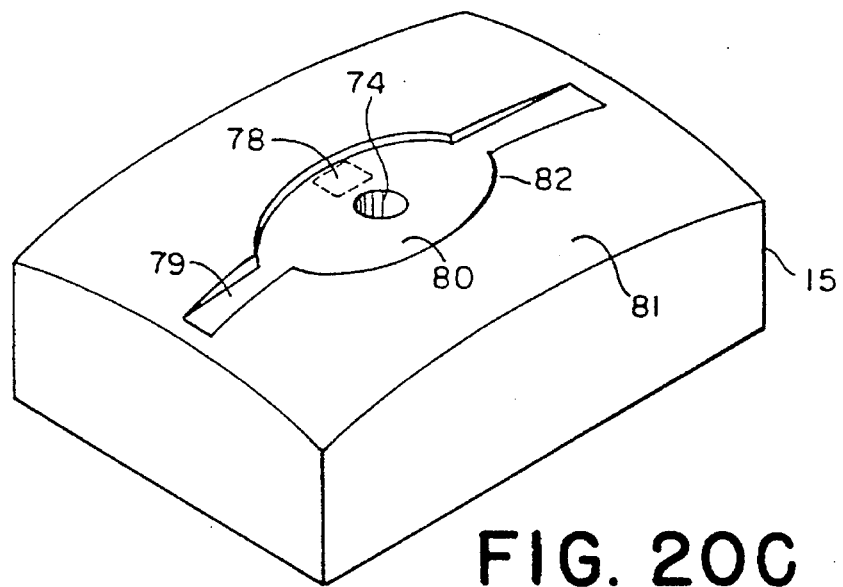
FIG. 20C is a bottom isometric of the monolithic structure of FIG. 20A.

FIGS. 20A and 20B show an integrated optics tracking sensor 75 attached to a magnetic read/write head 15.

A hole 74 in the magnetic head 15 allows light from the edge mounted laser 76 to be incident on the magnetic disk 10. The repeatable reflective light is incident upon the detector 77 in the integrated optics 75. Integrated optics 75 consists of optical elements and an optical path built up much as integrated circuits are, by lithographic means with parts of the optical path being essentially like optical fibers or waveguides built into the layers and patterns. Such a head has integrated HOE's, lasers, detectors and waveguides as described in: "FOCUSING GRATING COUPLER DESIGN METHOD USING HOLOGRAPHIC OPTICAL ELEMENTS", Patrick J. Cronkite and George N. Lawrence, Feb. 15, 1988, Vol. 27, No. 4; *APPLIED OPTICS,* PP. 679–683.

Magnetic head 15 has the usual magnetic pole piece 78 and groove 79. As explained more fully in the Losee, et al U.S. Pat. No. 4,414,592 and 4,975,794, groove 79, flat area 80, and rounded area 81 provide good coupling of the head to a floppy disk. The oval outline of a very slight edge, which is very obtuse and between the flat and round zones, is denoted 82.

The materials of the substrates for the integrated optics 75 and the magnetic head 15 may be different, but the two are handled with very similar processing steps, being cut and polished to fine dimensional tolerances. The two devices can be made such that the focal distance of the optical part is precisely equal to the thickness of the magnetic head such that the two small "blocks" can be stacked with their edges referenced and cemented, and the optical spots come to be co-related in position precisely as they need to be relative to the magnetic head pole pieces.

While particular embodiments of the invention has been shown and described, various modifications are within the true spirit and scope of the invention. The appended claims are, therefore, intended to cover all such modifications.

What is claimed is:

1. An optical tracking servo system for a disk storage system in which information is read from or written to a plurality of data tracks about the rotational axis of the disk by a head comprising:

optical servo tracks pre-recorded in relation to said data tracks for indicating the radial position of said head with respect to said disk;

a scale grating fixed with respect to said disk storage system, said grating including successive light and dark bars;

means for producing an optical interference pattern having a fringe spacing related to the spacing of said bars of said grating, said interference pattern having a length which extends over several bars;

means for imaging said interference pattern upon said grating; and means for generating a servo error signal, said means for generating a servo error signal including a detector for detecting light which is the convolution of said interference pattern and said grating.

2. The system recited in claim 1 wherein said grating has a flag area different from the remainder of said grating, said flag area marking a reference position of said head with respect to said disk; and means responsive to the convolution of said intereference pattern and said grating for indicating that said head is at said reference position.

3. The system recited in claim 2 further comprising:

a radial position counter for counting increments of radial movement of said head;

said counter being reset by said means for indicating that said head is at said reference position.

4. The system recited in claim 2 wherein said grating comprises successive light and dark bars.

5. The system recited in claim 4 wherein said flag area has at least one light bar and at least one dark bar having significantly wider width than the remainder of said bars.

6. The system recited in claim 4 wherein said flag area is a void of said successive light and dark bars.

7. The system recited in claim 6 wherein said void is narrower than the width of said interference pattern which is imaged on said grating.

8. The system recited in claim 1 further comprising:

means for generating a second optical interference pattern, said second optical interference pattern being out of phase with the first recited optical interference pattern, both of said interference patterns being imaged on said grating.

9. The system recited in claim 8 further comprising:

means for generating a third optical interference pattern imaged on said grating;

said grating having a flag area marking a reference position of said head with respect to said disk;

said flag area being in the path of said third optical interference pattern.

10. An optical tracking servo system for a disk storage system in which information is read from or written to a plurality of data tracks about the rotational axis of the disk by a head comprising:

optical servo tracks pre-recorded in relation to said data tracks for indicating the radial position of said head with respect to said disk;

means for producing an optical interference pattern having a fringe spacing related to the spacing of said servo tracks, said interference pattern having a length which extends over several tracks;

means for imaging said interference pattern on said servo tracks, wherein said means for imaging said interference pattern includes a holographic optical element and a lens molded on a block of transparent plastic, said holographic optical element being formed on one flat surface of said block of transparent plastic and said lens being molded on the opposite surface to provide temperature compensation of the optical elements; and means for generating a servo error signal which is the convolution of said interference pattern and said servo tracks.

11. An optical tracking servo system for a disk storage system in which information is read from or written to a plurality of data tracks about the rotational axis of the disk by a magnetic head for reading magnetically recorded data in said data tracks, comprising:

optical servo tracks pre-recorded in relation to said data tracks for indicating the radial position of said head with respect to said disk;

means for producing an optical interference pattern having a fringe spacing related to the spacing of said servo tracks, said interference pattern having a length which extends over several tracks;

means for imaging said interference pattern on said servo tracks; and means for generating a servo error signal which is the convolution of said interference pattern and said servo tracks, wherein said means for generating a servo error signal comprises an optical head responsive to the convolution of said interference pattern and said servo tracks, said magnetic head and said optical head being attached as a common structure.

12. The system recited in claim 11 wherein said optical head includes integrated optical elements attached to said magnetic head.

13. The system recited in claim 12 wherein said integrated optics includes a laser diode source of light, holographic optical elements for producing said optical interference pattern, and a photodetector for generating said servo error signal.

* * * * *